Figure 1:
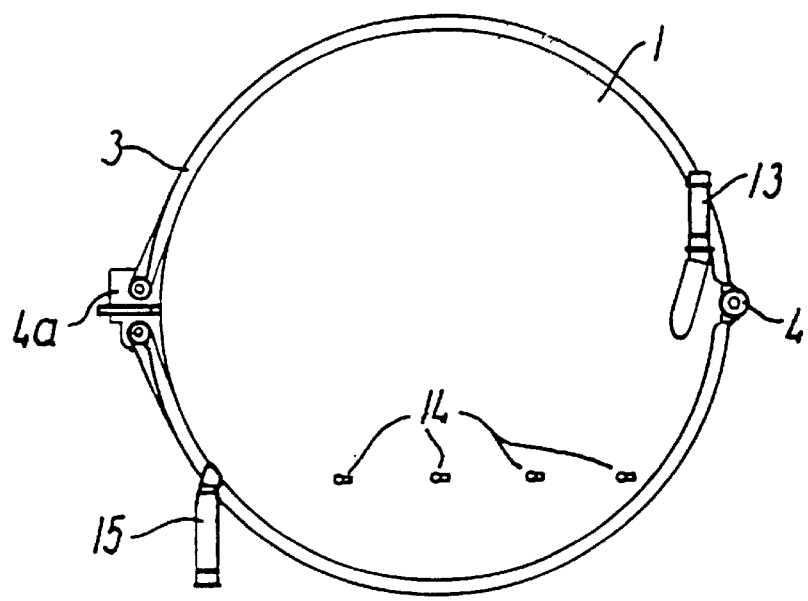

United States Patent [19]
Larsen et al.

[11] Patent Number: 5,817,280
[45] Date of Patent: Oct. 6, 1998

[54] FLUID BED FOR PRODUCING AND/OR PROCESSING A PARTICULATE MATERIAL

[75] Inventors: Tage Møller Larsen, Farum; Finn Karl Nielsen, BirkerØd; Christian Reedtz Funder, Fredensborg; Jens Thousing Møller, AllerØd, all of Denmark

[73] Assignee: Niro Holding A/S, SØborg, Denmark

[21] Appl. No.: 637,691
[22] PCT Filed: Nov. 15, 1993
[86] PCT No.: PCT/DK93/00372
§ 371 Date: Apr. 29, 1996
§ 102(e) Date: Apr. 29, 1996
[87] PCT Pub. No.: WO95/13867
PCT Pub. Date: May 26, 1995
[51] Int. Cl.⁶ .............. B01J 8/18; B01F 13/02; F23G 5/00
[52] U.S. Cl. .............. 422/143; 366/101; 110/245
[58] Field of Search .............. 422/143; 360/101; 110/245

[56] References Cited

U.S. PATENT DOCUMENTS

| | | | |
|---|---|---|---|
| 4,320,089 | 3/1982 | Huttlin | 422/140 |
| 4,445,919 | 5/1984 | Cole et al. | 65/27 |
| 4,448,134 | 5/1984 | Foote | 110/245 |
| 4,685,809 | 8/1987 | Huttlin | 366/101 |

*Primary Examiner*—Donald E. Adams
*Assistant Examiner*—Hankyel T. Park
*Attorney, Agent, or Firm*—Sughrue, Mion, Zinn, Macpeak & Seas, PLLC

[57] ABSTRACT

A fluid bed for producing and/or processing a particulate material, said bed comprising a container constituted by two convex parts, through which a perforated plate for supporting a fluidized particle layer is fixed. Nozzles for injection of a treatment liquid are provided in the perforated plate and above the plate filtering means are provided for removal of particles entrained by the fluidizing gas.

15 Claims, 3 Drawing Sheets

FLUID BED FOR PRODUCING AND/OR PROCESSING A PARTICULATE MATERIAL

The invention relates to a fluid bed apparatus for producing and/or processing particulate material.

Processing of particulate material while fluidized in a gas flow is used in many different industries and for many different purposes such as drying, removal of dust, agglomeration, and coating.

The fluid bed apparatus according to the invention is primarily, but not exclusively intended for use within the pharmaceutical industry, where fluid beds are typically used for agglomerating processes for the attainment of granules suited for pelleting, in which case the process is termed granulation, or for the attainment of a dust-free, free-flowing powder. The granulation is typically performed by spraying droplets of a liquid on a particulate material, which has been created in or introduced into the bed and which is kept fluidized in a gas flow, said drops tackifying the particles either by partial dissolution thereof or by means of a binding agent dissolved in the liquid or admixed to the particles. Simultaneously with and after the agglomeration of the particles thus tackified the solvent added to the liquid evaporates and dry agglomerates remain.

Another process which is commonly carried out within the pharmaceutical industry in fluidizing beds consists of coating pharmaceutical products, for instance with a view to controlling their release after administration to the patient. This coating is made by spraying a solution of the coating agent onto particles of the pharmaceutical product while being kept fluidized in such a way that the solvent contained in the coating agent quickly evaporates.

Fluidizing processes of the above kind are traditionally carried out batch-wise, even though a continuous production for either a particularly big batch or a proper continuous operation often will entail considerable advantages thereover.

A further argument for continuous processing in a fluidizing bed is the fact that the processes both before and after the fluid beds to an increasing extent show bigger batch volume or are carried out continuously.

One of the drawbacks of a production in batches in relation to a continuous production is obviously that a bigger product volume can only be produced by operating with several beds or by using many batch shifts. A large number of batch recoverings is, however, disadvantageous on account of the involved risk of dust, waste and contamination of the product. If the production is to be increased by using a particularly big bed, a big installation space is required, and if errors occur, the whole of the big batch is to be disposed of.

Still, as mentioned, batched fluidizing processes are widespread within the pharmaceutical industry, and these processes are typically performed in fluid beds which for cleaning reasons and for the attainment of resistance against explosions, in particular dust explosion, are normally provided with a cylindrical container.

Whereas it is often tried in other industrial branches, where the risk of explosions is present, to reduce the risk of damage by providing possibilities for pressure relief, this solution is not suitable in the pharmaceutical industry, where a prevention of the spreading of the products, in which the explosion may happen, is aimed at. Often, it is tried to avoid explosions in processing plants within the chemical industry by installing a plant for automatic introduction of suitable suppression agents, such as carbon dioxide, halogenated carbon hydride, powder extinguishing agents, etc., as a reaction to signals from pressure or temperature sensors. Such plants are, however, costly and entail the risk of damage to the product by malactivation. It is therefore within the pharmaceutical industry advantageous to meet the risk of dust explosion by designing the bed with such a strength that it may withstand the explosion pressure, whereby pressure relief and plants for the introduction of suppression agents are made superfluous.

Furthermore, it is with a view to sterilizing the bed by means of vapor at pressure above atmospheric desirable that the bed is able to resist the vapor pressure required therefore. Finally, it is important that the bed is easy to clean, in particular at the inside, but also on the outside, for which reason horizontal areas, on which dust (product or dirt) may deposit, are to be avoided, just like all interior faces should be easily accessible for cleaning, inspection and validation.

The known apparatuses for performing continuous fluidizing processes do not meet these requirements. Thus, they are normally designed as a box, which demands a considerable consumption of material for explosion-safe support. Furthermore, the cleaning of these apparatuses are most labor demanding, as they cannot immediately be opened for cleaning and inspection, and they have many horizontal faces, on which product and dust are deposited, which makes them unfit for a hygienic production. An example of a known apparatus for continuous fluidizing is disclosed in DE-A-3337770.

It is the object of the invention to provide a fluid bed, which can be used for continuous processing of a particulate material but also for production in batches, said apparatus not having the above drawbacks.

This object is achieved by means of a fluid bed apparatus for processing a particulate material, which is introduced into or produced in the bed, said bed comprising a container surrounding a perforated air distributing plate for a fluidized particle layer, an opening present above the air distributing plate for possible introduction of a particulate material to be processed and an outlet for particulate material processed in the fluidizing particulate layer, at least one inlet being provided below the perforated air distributing plate for fluidizing gas and at least one outlet being provided above the air distributing plate for fluidizing gas, said fluid bed being according to the invention characteristic in that the container substantially consists of two convex, mutually separable parts connected by a substantially vertical connection area and in that the interior outline of the parts in preferably both horizontal and vertical sections is substantially curved.

The dimensions of the container are preferably such as to withstand an interior pressure of 10 bar. This is considered sufficient for resisting the dust explosions which may occur during the use of the apparatus and makes it possible to use vapor above atmospheric for sterilization of the apparatus.

A sealing between the parts is advantageously attained by use of a seal or the like which in connection with clamping means for the parts ensures a tight closing thereof, thus making it possible for the apparatus not only to withstand, as mentioned, an interior excess pressure, but also to operate at pressures below the atmospheric.

Figure 4:
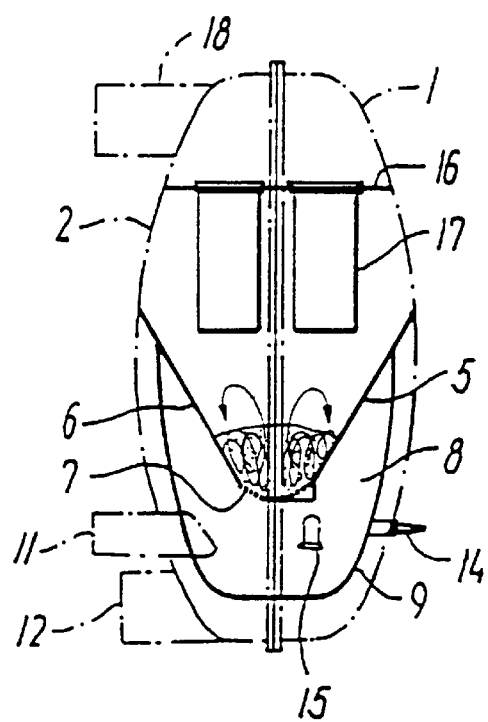
Figure 5:
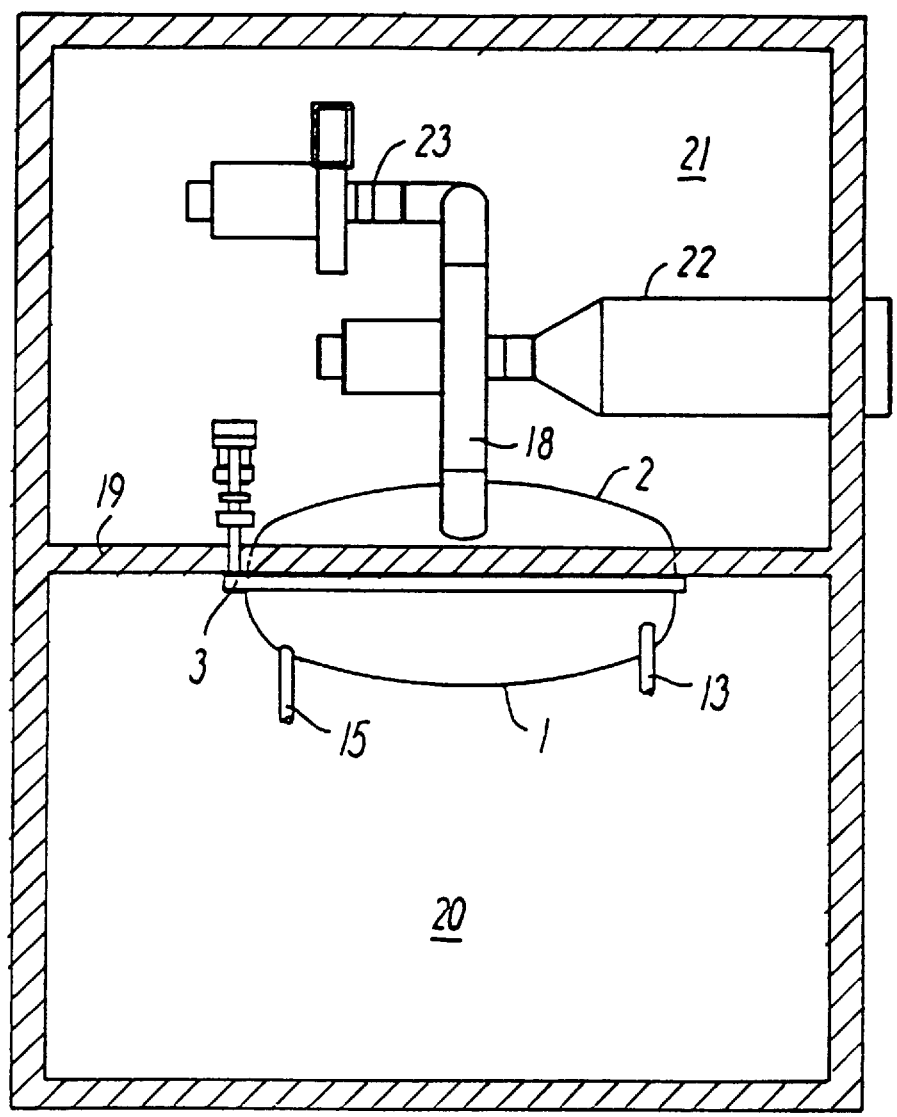

The invention will be explained in detail in the following with reference to the drawing, in which FIG. 1 in front view schematically shows an embodiment of the bed according to the invention seen from the front, FIG. 2 in front view schematically shows the same embodiment seen from the side, FIG. 3 in an oblique view very schematically shows in particular the interior parts of the same embodiment, FIG. 4 in a schematical lateral view shows in particular the interior parts of the embodiment, and FIG. 5 shows an apparatus according to the invention built into a wall, seen from above.

As FIGS. 1–4 of the drawing thus show the same embodiment of the bed according to the invention, reference is made in the following to these four figures together.

Figure 2:
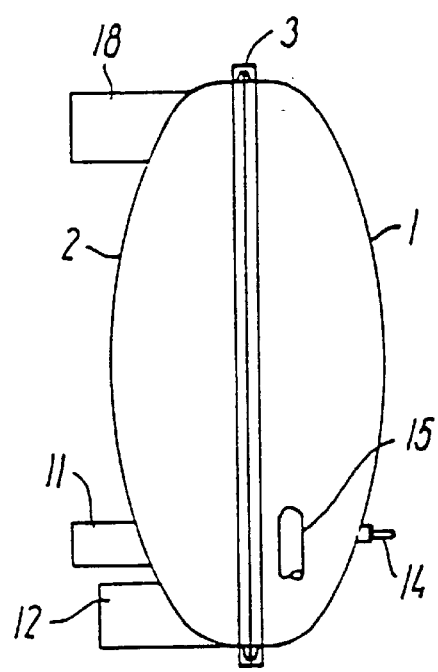
Figure 3:
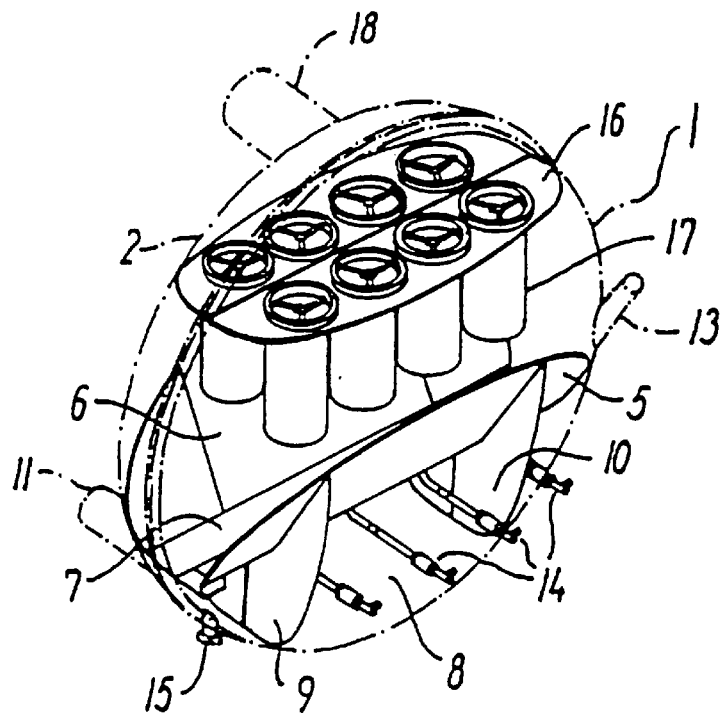

In the drawing 1 represents a first convex part of Klöpper-shape, which as shown in FIG. 1 is tightened together with the second part 2 (FIGS. 2–4).

FIGS. 1 and 2 shows a clamping ring or a clamp 3, in the embodiment shown consisting of two halves hinged at 4a. At 4a a tightening mechanism is provided too, said mechanism turning the two halves of the ring towards each other, and their position is maintained by means of a locking mechanism 4. Thereby a compression of the flange-like vertical connection areas of the two parts 1,2 is attained, between which connection areas a (not shown) sealing ring is provided.

In the preferred embodiment, in which the two parts are Klöpper-shape, said connection area will be circular.

As to a more detailed definition the term Klöpper-shape reference is made to DIN 28011. It consists of a convex part ending in a cylindrical portion, the length of which in the present connection may vary widely. This Klöpper-shape is optimum in respect of pressure maintenance and is particularly advantageous seen from a cleaning point of view.

The part 2 is provided with (not shown) welded supporting means or it may be fixed in a partition wall as explained in more details below in connection with the mention of FIG. 5.

At the interior face of each of the two parts 1 and 2 a plate 5, 6 (FIGS. 3 and 4) is mounted, preferably by welding. The two plates 5 and 6 extend obliquely downwards and their lower edge is designed to hold a perforated air distributing plate 7, which is preferably concave in the transverse direction or composed by oblique or horizontal, plane portions thus making it form together with the plates 5 and 6 a substantially horizontal, trough-shaped path transversely to the container formed by the two parts 1,2.

The perforations of the air distributing plate 7 are preferably designed as so-called gill slits delivering the gas blown through them in an oblique direction thereby controlling the direction of movement of the fluidized particles which are present on the air distributing plate. A detailed description of the design of such gill slits in air distributing plates for fluidizing purposes is given in EP-A-474949.

A plenum chamber 8 is provided below the trough-shaped path formed by the plates 5, 6, said chamber being in the embodiment shown divided into three compartments by two partition walls 9 and 10.

An inlet for fluidizing gas is connected with this plenum chamber or, if it is divided into several compartments, with each of them, shown in the drawing as 11 and 12, the third inlet leading to the compartment of the plenum chamber, which is farthest away in FIG. 3, being hidden in the drawing by the air distributing plate. In the container formed by the two parts 1 and 2 an inlet 13 is provided for particulate material to be processed, said inlet discharging above the perforated air distributing plate. The particulate material, which, when the bed is operated, is introduced through 13, is brought into a fluidized state by the air flow which from the various compartments of the plenum chamber 8 flows up through the perforations in the air distributing plate 7. As a consequence of the inherent tendency in a fluidized layer for spreading horizontally and on account of a possible influence by a guiding effect of the gill slits in the air distributing plate, cf. the above, the fluidized particulate material moves through the trough-shaped path which is formed by the perforated air distributing plate 7 and the two plates 5 and 6.

In a preferred embodiment of the apparatus the two plates 5 and 6 are without perforations, and this leads to the formation of a special whirling flow pattern as indicated in FIG. 4. Due to the fact that the particle layer only meets a substantially upwards gas flow in the central part, but not in areas above the oblique plates 5 and 6, a whirling movement is created which may be desirable for the attainment of a homogenous treatment of the individual particles and which furthermore facilitates the fluidizing of materials which are otherwise very difficult to fluidize.

The apparatus shown is provided with a number of nozzles for atomization of treatment fluid on the particles to be processed, for instance agglomerated or coated. The nozzles may extend through the perforated plate or be introduced above it. Inlet tubes for these nozzles are on the drawing designated by 14. The nozzles which are not seen in the drawing are preferably two-component nozzles which discharge in level with or above the air distributing plate 7 and ensure a homogenous application of treatment fluid to the particles whirling in the fluidized layer.

In spite of the whirling movement, which is described above, the conveyance of material through the trough-shaped path formed by the plates 5 and 6 and the air distributing plate 7 is carried out substantially as plug flow, the particles then being processed sequentially by passing the various nozzles which may be run separately with different treatment fluids.

In a similar way this plug flow, in connection with the supply of fluidizing gases of different temperature to the various compartments of the plenum chamber makes possible a controlled processing, said processing ending with an after-drying and/or cooling in the last part of the fluidized layer, a separate drying or cooling outside the apparatus becoming then superfluous.

The apparatus is provided with an outlet 15 which in the embodiment shown in the drawing is present at the end of the perforated plate which is opposite the inlet 13, through which the processed and possibly cooled particulate material is discharged.

The apparatus may also be used without introduction of particulate material through 13, a solution or suspension which by the abovementioned nozzles are atomized being supplied for the formation of the particles.

In the upper portion of the container formed by the parts 1 and 2 a wall 16 which may consist of two or more parts is provided, said wall carrying a number of filters 17 produced from textile, polymer material, metal or ceramic material, through which the fluidizing gas which leaves the fluidized layer is brought to pass in such a way that the particles entrained by this gas are deposited on said filters. By means of devices not shown, for instance for pulsating reverse flow cleaning, the particles deposited on the filters may be liberated, whereby they fall down onto the fluidized layer on desired places determined by the position of the filters, possibly for a renewed processing.

From the chamber above the wall 16 carrying the filters the filtrated gas leaves through an outlet 18.

The mounting of the filters in the container itself instead of using a separate filter unit, offers a number of advantages, not only is the demand for space reduced, but also the amount of cleaning work is reduced and an advantageous possibility of sterilizing the filters by vapor above atmospheric is attained simultaneously with the sterilization of the remaining part of the apparatus. To this may be added that an apparatus thus encased which also comprises the filters entails a simplification of the necessary or required precautions against explosion compared with the use of separate filters.

The apparatus according to the invention is preferably provided with permanently mounted cleaning nozzles which discharge into the interior of the container and make a cleaning of the interior of the container including the filters possible, and in the lower part of the container a valve is in that case provided for letting out cleaning fluid. The cleaning nozzles are preferably designed in such a way that they are inserted from the walls of the container and rotate in such a way that all the surfaces of the container interior may be cleaned. The container may thus, in connection with most products, be cleaned sufficiently without being opened, which is of essential importance for avoiding spreading of products which might otherwise be damaging to the health of persons operating the apparatus.

After such a rinsing the apparatus may without any risk be opened for inspection and possible further cleaning or exchange of filters and the perforated air distributing plate 7.

The fluid bed according to the invention may preferably be mounted as shown in FIG. 5 in such a way that one of the convex parts 2 is fixed in a partition wall 19 between a clean room 20 and another room 21, the second of the convex parts 1 being at the opening of the container moved into the clean room 20. The fluidizing gas is supplied from and taken out to said other room 21 through the part 2 built into the partition wall 19, whereas the powderous material is supplied from and taken out into the clean room 20 through said other half part 1. Hereby is achieved that the handling of the material, which is to be processed or which has been processed, as well as of the treatment fluids only takes place in the clean room 20 only, where the demands as to cleanliness are considerable, whereas the installations which deal with pre-treatment 22 and subsequent treatment 23 of fluidizing gas may be placed in a room, where the same particular demands as to cleanliness and hygiene are not made.

The apparatus is preferably manufactured in stainless steel and in a size of up to approx. 3 m in diameter.

Alternatively to the embodiment described in connection with FIGS. 1–4 the length of the path, through which the fluidized particles flow, may be increased by insertion of one or more (not shown) partition walls on top of and along the perforated air distributing plate 7, the particles being thus forced to pass back and fro several times. The particularly long path attained for the particle flow in fluidized state is particularly advantageous in connection with a treatment entailing several successive steps.

We claim:

1. A fluid bed apparatus for continuous processing a particulate material which is introduced into or produced in the bed, said bed comprising a container surrounding a perforated air distributing plate (7) for a fluidized particle layer, an opening (13) provided above the air distributing plate for possible introduction of a particulate material to be processed and an outlet (15) for particulate material processed in the fluidizing particle layer, at least one inlet provided below the perforated air distributing plate for fluidizing gas (11,12) and at least one outlet (18) provided above the air distributing plate for fluidizing gas, characterized in that the container essentially consists of two convex parts (1,2) that are separable from each other and arranged relatively to each other so that the area of contact between them is substantially vertical.

2. A fluid bed apparatus according to claim 1, characterized in that the interior outline of the parts (1,2) in both horizontal and vertical sections is substantially curved.

3. A fluid bed apparatus according to claim 1 characterized in that the contact area between the two parts is circular.

4. A fluid bed apparatus according to claim 1, characterized in that both parts are substantially Klöpper-shape.

5. A fluid bed apparatus according to any of the preceding claims, characterized in that the dimensions of the container are such as to withstand an interior pressure of 10 bar.

6. A fluid bed apparatus according to any of the preceding claims, characterized in that a plate (5,6) is fastened to each of the interior faces of the two parts, said plate holding, when the parts are connected, said perforated air distributing plate (7) and ensuring a substantially gas-tight sealing between the latter and the two convex parts (1,2).

7. A fluid bed apparatus according to claim 6, characterized in that said plates (5,6) extend from the parts (1,2), with which they are connected, obliquely downwards in such a way that together with said perforated air distributing plate (7) they form a substantially horizontally extending trough-shaped path.

8. A fluid bed apparatus according to any of the preceding claims, characterized in that nozzles extend through the perforated air distributing plate, said nozzles debouching in level with or above the air distributing plate and serving for spraying of a granulating liquid or a coating liquid onto the particles present in the fluidizing layer.

9. A fluid bed apparatus according to any of the preceding claims, characterized in that rinsing nozzles fixedly mounted extend into and discharge into the interior of the container, a rinsing of all the interior surfaces of the container being thus made possible.

10. A fluid bed apparatus according to any of the preceding claims, characterized in that above the perforated air distributing plate (7) and at a distance therefrom, filtering means (17) are provided, through which the fluidizing gas passes before reaching its outlet (18).

11. A fluid bed apparatus according to any of the preceding claims, characterized in that the two parts (1,2) are connected by means of a clamp (3).

12. A fluid bed apparatus according to any of the preceding claims, characterized in that one of the convex parts (2) is built into a partition wall (19) between a clean chamber (20) and a second chamber (21) in such a way that the second one of the convex parts (1) at the opening of the container is moved into the clean chamber (20) and that the fluidizing gas is supplied from and let out to said second chamber (21) through the part (2) built into the partition wall (19), whereas the powdery material is supplied from and recovered to said clean chamber (20) through said second part (1).

13. A fluid bed apparatus according to claim 2, characterized in that the contact area between the two parts is circular.

14. A fluid bed apparatus according to claim 2, characterized in that both parts are substantially Klöpper-shape.

15. A fluid bed apparatus according to claim 3, characterized in that both parts are substantially Klöpper-shape.

* * * * *